United States Patent
Kuwajima et al.

(12) 
(10) Patent No.: US 6,692,089 B2
(45) Date of Patent: Feb. 17, 2004

(54) BRAKE CONTROL DEVICE, BRAKE CONTROL METHOD, AND RECORDING MEDIUM

(75) Inventors: Masatoshi Kuwajima, Kanagawa (JP); Tomohiko Kogure, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/303,008

(22) Filed: Nov. 25, 2002

(65) Prior Publication Data

US 2003/0117015 A1 Jun. 26, 2003

(30) Foreign Application Priority Data

Nov. 26, 2001 (JP) ........................................ 2001-359119

(51) Int. Cl.⁷ ................ B60T 8/84; B60T 8/66
(52) U.S. Cl. ............. 303/163; 303/150; 303/165; 701/71; 701/80; 701/90; 701/74
(58) Field of Search ................ 303/150, 163, 303/156, 147, 148, 149, 175, 165; 701/70, 71, 90, 74, 80, 75, 77, 79, 78, 76; 180/197; 702/148

(56) References Cited

U.S. PATENT DOCUMENTS 6,122,585 A * 9/2000 Ono et al. ............... 701/71

FOREIGN PATENT DOCUMENTS

JP   10-071943 A1   3/1998

\* cited by examiner

*Primary Examiner*—Douglas C. Butler
(74) *Attorney, Agent, or Firm*—Rader Fishman & Grauer (57) ABSTRACT

The invention provides a brake control device for a vehicle, a brake control method and a recording medium having a program causing a computer to perform the brake control method. A tire friction characteristic with respect to a vehicle velocity or a wheel velocity is memorized in advance. When a brake is put on to the vehicle, a current slip ratio or a current slip velocity is found and an optimum slip ratio or an optimum slip velocity is calculated using the tire friction characteristic. Then, a difference between the optimum slip ratio and the found current slip ratio or a difference between the optimum slip velocity and the found current slip velocity is compared with a predetermined value. According to a result of the comparison, a braking force applied to the vehicle is controlled.

16 Claims, 5 Drawing Sheets

BRAKE CONTROL DEVICE, BRAKE CONTROL METHOD, AND RECORDING MEDIUM

BACKGROUND OF THE INVENTION

1. Field of the Invention

The present invention relates to a brake control device for controlling a braking force applied to wheels to prevent locking of the wheels when a brake is put on to a vehicle such as an automobile mounted with tires, a brake control method therefor, and a computer readable recording medium having a program for the method recorded therein. In particular, the present invention relates to a brake control device with which a time lag before the brake control starts is shortened to reduce a braking distance of a vehicle when the brake is put on to the vehicle, a brake control method therefor, and a recording medium.

2. Description of the Related Art

Conventionally, various techniques for a control method of an anti-lock brake system (hereinafter referred to as ABS) have been proposed.

For example, in one technique, a wheel velocity of a wheel is detected every moment, and this wheel velocity is processed by time differentiation in a computing unit mounted on a vehicle to find a wheel deceleration. Then, if the wheel deceleration thus obtained comes across less than a predetermined value set in advance, a brake pressure to be applied get decreased to prevent locking of the tire of the wheel (prior art 1).

On the other hand, JP 10-71943 A discloses the ABS described below (prior art 2).

Figure 5:
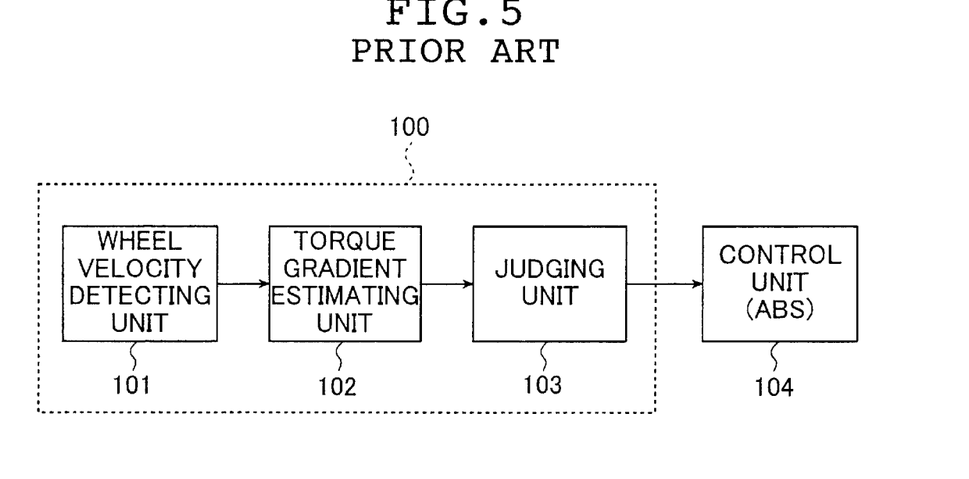
FIG. 5 is a block diagram showing a control start discriminating device in a conventional anti-lock brake system.
Figure 6:
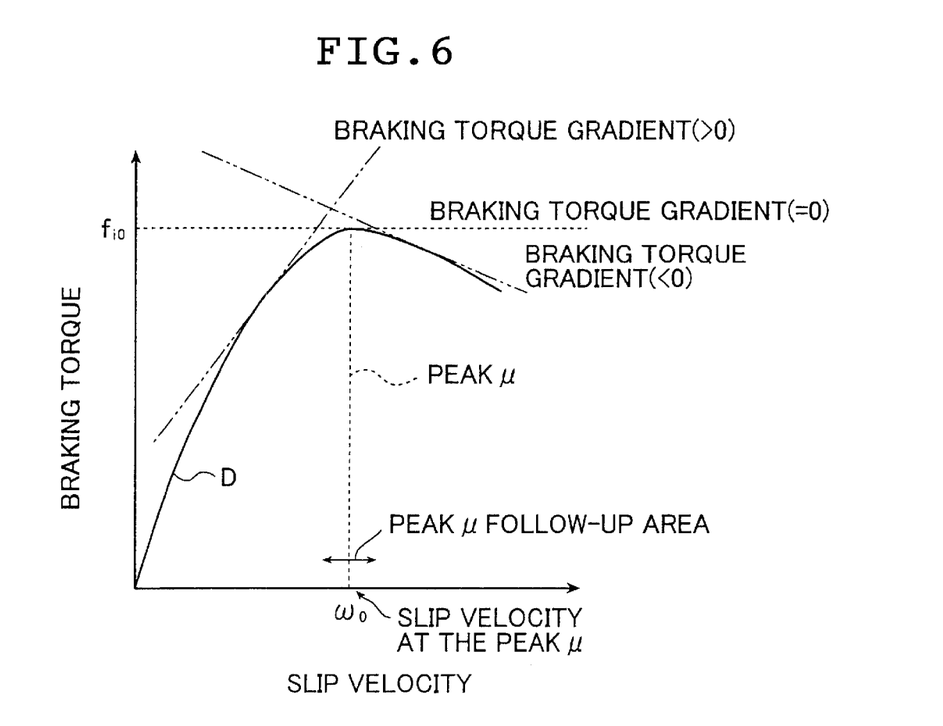
FIG. 6 is a graph showing dependencies of a braking torque and a braking torque gradient on a slip velocity of a tire.
Figure 7:
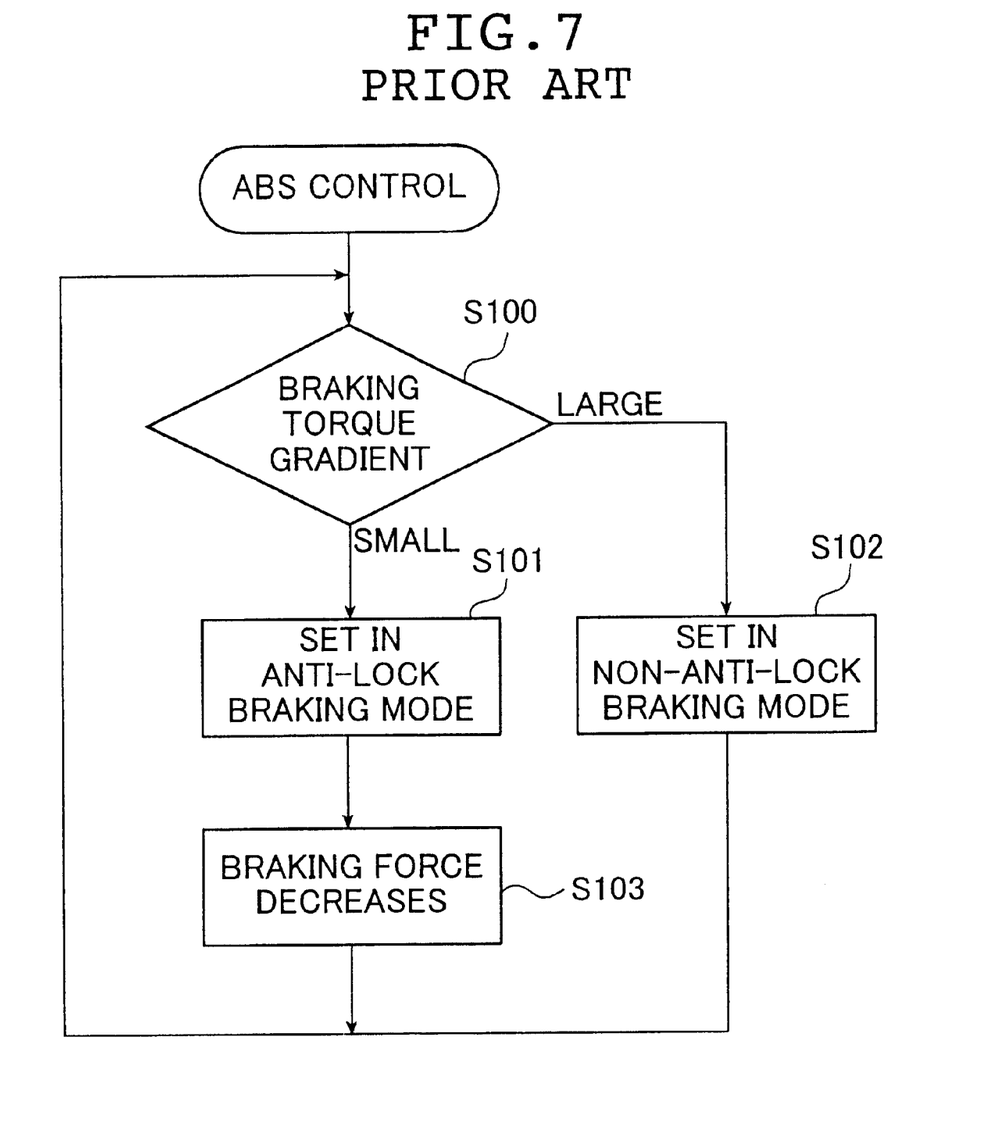
FIG. 7 is a flow chart showing an ABS control start discrimination method in the conventional anti-lock brake system.

FIG. 5 is a block diagram showing a control start discriminating device in the ABS disclosed by the prior art 2. FIG. 6 is a graph showing dependencies of a braking torque and a braking torque gradient on a slip velocity, in which the slip velocity is assigned to the horizontal axis and the braking torque is assigned to the vertical axis. FIG. 7 is a flow chart showing a control start discrimination of the ABS by the conventional control start discriminating device.

As shown in FIG. 5, a control start discriminating device 100 includes a wheel velocity detecting unit 101 for detecting a wheel velocity at each predetermined sampling time, a torque gradient estimating unit 102 for estimating a gradient of a braking torque with respect to a slip velocity from time-series data of the detected wheel velocity, and a judging unit 103 for comparing the estimated braking torque gradient with a reference value to judge a control starting point and a control finishing point of a control unit 104 of the ABS. Then, the control starting point of the ABS is judged based on the gradient of the braking torque.

As shown in FIG. 6, a curve D is a curve indicating a change in a braking torque with respect to a slip velocity. On this curve D, an inclination of a tangent to the curve D at an arbitrary slip velocity stands for a braking torque gradient. Plus or minus of this control torque gradient changes at a peak $\mu$ point where the braking torque gets maximized. The braking torque gradient becomes zero at the peak $\mu$ point, becomes positive in an area where a slip velocity is smaller than that at the peak $\mu$ point, and becomes negative in an area where a slip velocity is larger than that at the peak $\mu$ point.

Control start discrimination of the ABS in the above-mentioned prior art 2 will be described. As shown in FIG. 7, first, the control start discriminating device 100 judges whether a braking torque gradient estimated by the torque gradient estimating unit 102 is larger or smaller than a reference value (step S100). If it is judged that the braking torque gradient is larger than the reference value in the step S100, the control start discriminating device 100 sets the ABS in a non-anti-lock braking mode (step S102). On the other hand, if it is judged that the braking torque gradient is smaller than the reference value, the control start discriminating device 100 sets the ABS in an anti-lock braking mode (step S101). Next, after setting the ABS in the anti-lock braking mode, the control start discriminating device 100 controls a brake pressure to reduce a braking force, thereby preventing locking of tires (step S103).

In this way, in the prior art 2, the control start discriminating device 100 judges a control starting point by checking a braking torque gradient. This judgment makes use of the fact that a slip velocity reaches the peak $\mu$ point when the braking torque gradient is zero.

However, in the prior art 1, a braking force is required to be applied until a desired slip ratio is reached or a desired slip velocity is exceeded once in order to grasp an optimum slip ratio or an optimum slip velocity corresponding to an initial state of braking, that is, a slip ratio or a slip velocity at which a braking torque becomes maximum. Since the optimum slip ratio or the optimum slip velocity is calculated, extra time is required and a time lag before the control starts is lengthened. Thus, there is a problem in that it takes time to bring tires into a state of the desired slip ratio or slip velocity and a braking distance gets long. In particular, it is extremely important to reduce a braking distance on slippery road surfaces such as a wet road surface and a frozen road surface.

On the other hand, in the prior art 2, a braking torque gradient is used for judging a control starting point. Since this braking torque gradient is calculated in advance using a history of wheel velocities, a calculation time is required. Therefore, a time lag before the control starts is lengthened. In addition, since the control of a braking force is simply decided according to plus or minus of the braking torque gradient qualitatively in the anti-lock braking mode, it is not guaranteed that a braking torque is always maximized when the brake is put on.

SUMMARY OF THE INVENTION

The present invention has been devised to solve such problems of the prior art, and therefore has an object to provide a brake control device that, when the brakes are put on to a vehicle, can control a braking force quantitatively such that a slip ratio becomes optimum and can reduce a time lag before the control starts to reduce a braking distance of the vehicle, a brake control method therefor, and a computer readable recording medium having a program for the brake control method recorded therein.

The invention provides a brake control device of a vehicle which applies a braking force to a wheel mounted with a tire to brake the vehicle, comprising: a memory device storing therein a friction characteristic of the tire with respect to a vehicle velocity of the vehicle or a wheel velocity of the wheel; a detecting unit for detecting the vehicle velocity of the vehicle and the wheel velocity of the wheel; a signal generating unit for, when the braking force is applied to the wheel, finding a slip ratio based on the vehicle velocity and the wheel velocity detected by the detecting unit and, finding an optimum slip ratio, at which a maximum friction force is generated by the tire at the vehicle velocity or the wheel velocity detected by the detecting unit, by using the characteristic called from the memory device and, if a difference found by subtracting the optimum slip ratio from the found slip ratio is equal to or more than a predetermined value, generating a control signal for controlling the braking force according to the difference; and a braking unit for controlling the braking force based on the generated control signal to adjust the wheel velocity.

It is preferable that the characteristic is supplied to the memory device from an external device or a data recording medium, and it is also preferable that the characteristic includes a rate of change of the optimum slip ratio with respect to the vehicle velocity or the wheel velocity, and the rate of change has a negative value. And it is still also preferable that the memory device stores the characteristic that the optimum slip ratio changes linearly with respect to the vehicle velocity or the wheel velocity.

For example, when the vehicle velocity or the wheel velocity is assumed to be a velocity V (km/h), the optimum slip ratio with respect to the velocity V is assumed to be Sd (%), the memory device may preferably store coefficients "a" and "b" represented by a following expression (1) for the characteristic:

$$Sd = a \times V + b \quad (1)$$

Then, the coefficient "a" is preferably a value in a range of −0.2 to −0.01.

The invention also provides a brake control device of a vehicle which applies a braking force to a wheel mounted with a tire to brake the vehicle, comprising: a memory device storing therein a friction characteristic of the tire with respect to a vehicle velocity of the vehicle or a wheel velocity of the wheel; a detecting unit for detecting the vehicle velocity of the vehicle and the wheel velocity of the wheel; a signal generating unit for, when the braking force is applied to the wheel, finding a slip velocity based on the vehicle velocity and the wheel velocity detected by the detecting unit and, finding an optimum slip velocity, at which a maximum friction force is generated by the tire at the vehicle velocity or the wheel velocity detected by the detecting device, by using the characteristic called from the memory device and, if a difference found by subtracting the optimum slip velocity from the found slip velocity is equal to or more than a predetermined value, generating a control signal for controlling the braking force according to the difference; and a braking unit for controlling the braking force based on the generated control signal to adjust the wheel velocity.

It is preferable that the characteristic is supplied to the memory device from an external device or a data recording medium, and it is also preferable that the characteristic includes a rate of change of the optimum slip velocity with respect to the vehicle velocity or the wheel velocity, and the rate of change has a negative value. And it is still also preferable that the memory device stores the characteristic that the optimum slip velocity changes quadratically with respect to the vehicle velocity or the wheel velocity.

For example, when the vehicle velocity or the wheel velocity is assumed to be a velocity V (km/h), and the optimum slip velocity is assumed to be Sv (km/h), the memory device may preferably store coefficients "a" and "b" represented by a following expression (2) for the characteristic:

$$Sv = (a \times V + b) \times V/100 \quad (2)$$

Then, the coefficient "a" is preferably a value in a range of −0.2 to −0.01.

The invention provides a brake control method for a vehicle which applies a braking force to a wheel mounted with a tire to brake the vehicle, comprising: detecting a vehicle velocity of the vehicle and a wheel velocity of the wheel; finding a slip ratio based on the detected vehicle velocity and wheel velocity; when the braking force is applied to the wheel, finding an optimum slip ratio at which a maximum friction force is generated by the tire at the detected vehicle velocity or wheel velocity, by using a friction characteristic of the tire with respect to the vehicle velocity or the wheel velocity; if a difference found by subtracting the optimum slip ratio from the found slip ratio is equal to or more than a predetermined value, generating a control signal for controlling the braking force according to the difference; and controlling the braking force based on the generated control signal to adjust the wheel velocity.

The invention also provides a brake control method for a vehicle which applies a braking force to a wheel mounted with a tire to brake the vehicle, comprising: detecting a vehicle velocity of the vehicle and a wheel velocity of the wheel; finding a slip velocity based on the detected vehicle velocity and wheel velocity; when the braking force is applied to the wheel, finding an optimum slip velocity, at which a maximum friction force is generated by the tire at the detected vehicle velocity or wheel velocity, by using a friction characteristic of the tire with respect to the vehicle velocity or the wheel velocity; if a difference found by subtracting the optimum slip velocity from the found slip velocity is equal to or more than a predetermined value, generating a control signal for controlling the braking force according to the difference; and controlling the braking force based on the generated control signal to adjust the wheel velocity.

The invention provides a recording medium having recorded therein a computer readable program for causing a computer to perform adjustment of a braking force, when the braking force is applied to a wheel mounted with a tire to brake a vehicle, wherein the program includes: a procedure for causing a computing unit of the computer to calculate a slip ratio based on a vehicle velocity of the vehicle and a wheel velocity of the wheel; a procedure for calling a friction characteristic of the tire with respect to the vehicle velocity or the wheel velocity stored in a memory device of the computer in advance and causing the computing unit to calculate an optimum slip ratio, at which a maximum friction force is generated by the tire at the vehicle velocity or the wheel velocity, by using the called characteristic; a procedure for, if a difference found by subtracting the optimum slip ratio from the calculated slip ratio is equal to or larger than a predetermined value, causing the computing unit to generate a control signal for controlling the braking force according to the difference.

The invention also provides a recording medium having recorded therein a computer readable program for causing a computer to perform adjustment of a braking force, when the braking force is applied to a wheel mounted with a tire to brake a vehicle, wherein the program includes: a procedure for causing a computing unit of the computer to calculate a slip velocity based on a vehicle velocity of the vehicle and a wheel velocity of the wheel; a procedure for calling a friction characteristic of the tires with respect to the vehicle velocity or the wheel velocity stored in a memory device of the computer in advance and causing the computing unit to calculate an optimum slip velocity, at which a maximum friction force is generated by the tire at the vehicle velocity or the wheel velocity, by using the called characteristic; a procedure for, if a difference found by subtracting the optimum slip velocity from the calculated slip velocity is equal to or larger than a predetermined value, causing the computing unit to generate a control signal for controlling the braking force according to the difference.

DETAILED DESCRIPTION OF THE PREFERRED EMBODIMENTS

A brake control device and a brake control method in accordance with the present invention will be described in detail based on preferred embodiments shown in the accompanying drawings.

Figure 1:
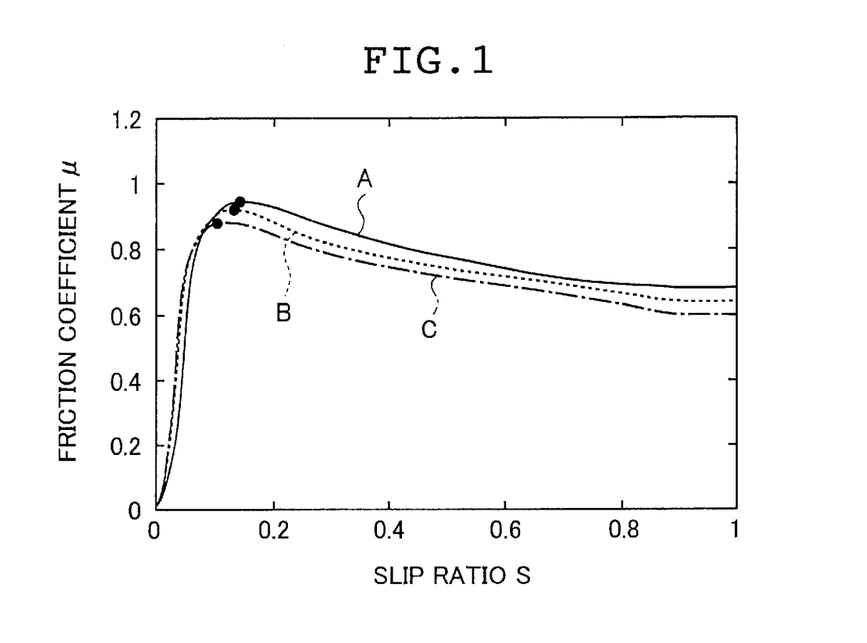
FIG. 1 is a graph showing an example of a $\mu$-S characteristic of a tire at various vehicle velocities used in the prevent invention.

FIG. 1 is a-graph of $\mu$-S characteristics showing a relationship between a slip ratio S and a friction coefficient $\mu$ of a tire at various vehicle velocities, in which the slip ratio S is assigned to the horizontal axis and the friction coefficient $\mu$ is assigned to the vertical axis. Note that the friction coefficient $\mu$ is a value found by dividing a braking force applied to a wheel by a load applied to the wheel. In FIG. 1, a curve A shown by a solid line indicates a $\mu$-S characteristic at a vehicle velocity of 40 km/h, a curve B shown by a broken line indicates a $\mu$-S characteristic at a vehicle velocity of 60 km/h, and a curve C shown by an alternate long and short dash line indicates a $\mu$-S characteristic at a vehicle velocity of 80 km/h.

As a result of earnest examination for solving the above-mentioned problems, the inventors found out that an optimum slip ratio maximizing the friction coefficient $\mu$ is not decided without depending upon a travelling velocity of tires (vehicle velocity) and a wheel velocity; a value of the optimum slip ratio changes in accordance with the vehicle velocity or the wheel velocity, that is, the optimum slip ratio of the tire has a velocity dependency. In other words, as shown in FIG. 1, the inventors discovered that a value of the optimum slip ratio tends to gradually decrease as the vehicle velocity increases on the curves A, B, and C.

The present invention has been devised utilizing the velocity dependency of the tire $\mu$-S characteristic based on the above-mentioned discovery.

That is, the tire characteristic of an optimum slip ratio with respect to a vehicle velocity is stored in advance, and a target value of control of a slip ratio at the time when a brake is put on to a vehicle is assumed to be an optimum slip ratio at that point. In this case, since an optimum slip ratio does not have to be measured and is found simply by using the stored characteristic, a time lag before the brake control starts can be reduced. Thus, a braking distance of the vehicle can be shortened. Moreover, since a braking force is controlled quantitatively based on a difference between an optimum slip ratio and a current slip ratio, wheels can be braked using an optimum slip ratio at which the friction coefficient $\mu$ is the highest.

In addition, in the present invention, since the tire $\mu$-S characteristic is stored in advance, a detection mechanism for detecting an optimum slip ratio provided in a control device of the conventional ABS can be eliminated. Thus, a structure of the device can be simplified. In this way, since the brake control can start faster and more surely in the present invention, the present invention is particularly effective in control of the ABS on slippery road surfaces such as a wet road surface, and a frozen road surface.

Figure 2:
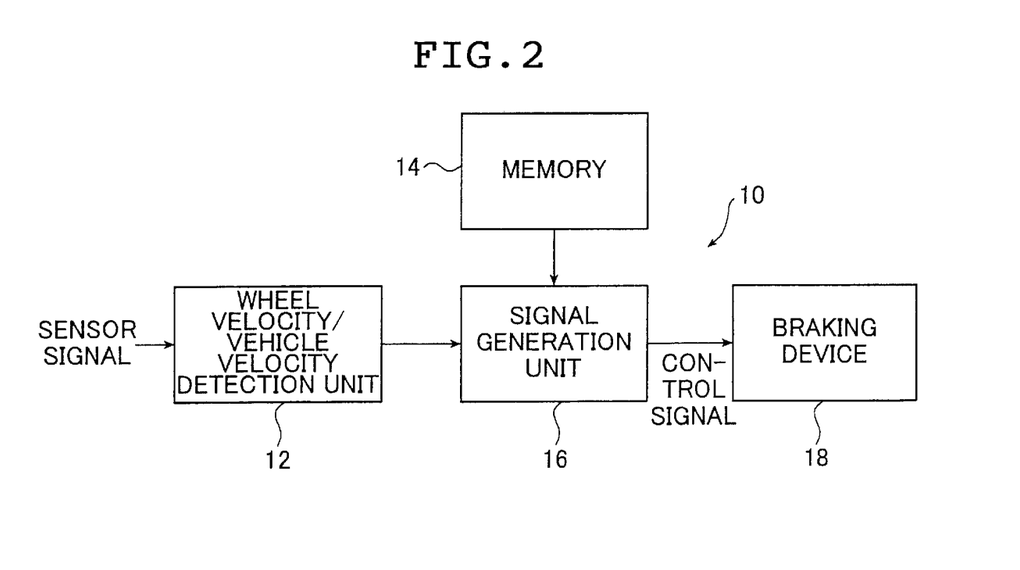
FIG. 2 is a block diagram showing a structure of an example of a brake control device of the present invention.

FIG. 2 is a block diagram showing a structure of a brake control device 10 that is an embodiment of the brake control device of the present invention.

The brake control device 10 is a brake control device that includes a wheel velocity/vehicle velocity detection unit 12, a memory 14, a signal generation unit 16, and a braking device 18. The brake control device 10 adjusts a wheel velocity in applying a braking force to wheels to brake a vehicle.

The wheel velocity/vehicle velocity detection unit 12, the memory 14, the signal generation unit 16, and the braking device 18 correspond to a detecting unit, a memory device, a signal generating unit, and a braking unit of the present invention (a first aspect of the present invention), respectively.

The wheel velocity/vehicle velocity detection unit 12 is a portion for detecting a vehicle velocity and a wheel velocity of wheels of a traveling vehicle. A sensor signal of each wheel is supplied to the wheel velocity/vehicle velocity detection unit 12 from a wheel velocity sensor arranged in each wheel of the vehicle.

The wheel velocity/vehicle velocity detection unit 12 finds a rotation angular velocity of each wheel based on the sensor signal sent from the wheel velocity sensor and multiplies the rotation angular velocity by a rolling radius of each wheel decided in advance, thereby calculating a wheel velocity of each wheel.

In addition, the wheel velocity/vehicle velocity detection unit 12 calculates a maximum wheel velocity among the calculated wheel velocities of the wheels as a vehicle velocity.

Here, the wheel velocity sensor is arranged in the vicinity of a rotating portion that rotates together with the rotation of each wheel of the vehicle, for example, in the vicinity of a rotor of a brake disk, and outputs a sensor signal of a pulse train having different pulse intervals depending on a rotation velocity of wheels.

Further, in this embodiment, a maximum wheel velocity among wheel velocities of wheels is selected and, if necessary predetermined correction is applied to this maximum wheel velocity to estimate a vehicle velocity. However, a method of finding a vehicle velocity is not limited to this in the present invention, and a vehicle velocity may be found directly by detecting a moving speed of an inequality surface of the ground using an optical vehicle velocity sensor or the like. In the present invention, a method of finding a wheel velocity and a vehicle velocity is not limited to this, and may be any method as long as it is publicly known.

In addition, a load applied to each wheel, which is measured by a load sensor or the like, may be used to set the rolling radius of each wheel with a prepared relationship between a load and a rolling radius of each mounted tire in advance. This is because the larger load is applied, the larger deformation is made for each mounted tire on the wheels and the smaller a rolling radius is changed. Further, an acceleration may be measured by an acceleration pick up sensor equipped to a vehicle and based on a result of the measured acceleration, a load distribution applied to the wheels of the vehicle is obtained to set a rolling radius using a load applied to each wheel which is found based on this load distribution. The vehicle velocity and the wheel velocity found in the wheel velocity/vehicle velocity detection unit 12 are sent to the signal generation unit 16.

The memory 14 is a portion storing the tire characteristic of an optimum slip ratio or an optimum slip velocity for each mounted tire on the wheels, at which a maximum friction force of the tire is generated, with respect to a vehicle velocity or a wheel velocity.

For example, when an optimum slip ratio is assumed to be Sd (%) and a vehicle velocity is assumed to be V (km/h), the tire characteristic is stored as coefficients "a" and "b" that represent a relationship between the optimum slip ratio Sd (%) and the vehicle velocity V (km/h) in a linear relationship as shown in the above-mentioned expression (1). Such coefficients "a" and "b" are stored for each wheel. If all wheels are mounted with tires having an identical structure and identical tire size, one pair of coefficients "a" and "b" may be stored. Note that the coefficient "a" is a rate of change of an optimum slip velocity with respect to a vehicle velocity. In addition, it is preferable that the above-mentioned tire characteristics are stored for various road surfaces such as a dry road surface, a wet road surface, and a frozen road surface.

Further, on each of the curves A, B, and C, a slip ratio at which a gradient becomes zero is assumed to be an optimum slip ratio Sd. When a vehicle velocity is assumed to be a velocity V, a value of the optimum slip ratio Sd becomes linear with respect to the velocity V. That is, the stored coefficients "a" and "b" are coefficients for calculating the linearly represented optimum slip ratio Sd from the velocity V.

The coefficient "a" is preferably a value in a range of −0.2 to −0.01, and the coefficient "b" is preferably a value in a range of 5 to 25. More preferably, the coefficient "a" is a value in a range of −0.15 to −0.03, and the coefficient "b" is a value in a range of 10 to 20.

Such coefficients "a" and "b" can be obtained by measurements of braking forces acting on wheel mounted with tires which are performed by a trailer type braking test vehicle.

For example, wheels having tires with a size of 205/60R15 91H mounted on wheels of a rim size of 15×6JJ with an inflation pressure of 200 kPa are mounted on the trailer type braking test vehicle, and the trailer type braking test vehicle is caused to travel on a general test road surface of a water depth of 2 mm under conditions of a load 4.0 kN, and velocities (vehicle velocities) 40 km/h, 60 km/h, and 80 km/h to measure a friction coefficient $\mu$ at various slip ratios at each vehicle velocity. In this case, for example, the coefficient "a" that is found in accordance with the above-mentioned expression (1) is −0.075 and the coefficient "b" is 14.8.

Note that characteristics stored in the memory 14 in the present invention are not limited to the above-mentioned coefficients "a" and "b", and may be two coefficients with which the optimum slip ratio Sd is represented in a linear function of a wheel velocity. In addition, an optimum slip velocity Sv may be used instead of the optimum slip ratio Sd. In this case, the optimum slip velocity Sv is represented as shown in the above-mentioned expression (2), and the coefficients "a" and "b" are stored in the memory 14.

Further, the stored characteristics in the above-mentioned example, that is, characteristics of an optimum slip velocity or an optimum slip ratio at which a maximum friction force of tires mounted on wheels are generated with respect to a vehicle velocity or a wheel velocity are coefficients with which the optimum slip ratio or the optimum slip velocity is represented in a linear or a quadratical relationship with respect to the vehicle velocity or the wheel velocity. However, in the present invention, coefficients are not limited to such coefficients and may be coefficients with which the optimum slip ratio or the optimum slip velocity is represented in a non-linear relationship with respect to the vehicle velocity or the wheel velocity such as a higher order polynomial. Moreover, a reference table consisting of a plurality of pairs of a value of a vehicle velocity or a wheel velocity and a value of an optimum slip ratio or an optimum velocity may be stored as a friction characteristic. In addition, numerical value data of a relationship between a friction coefficient and a slip ratio for each tire measured by varying a vehicle velocity or a wheel velocity may be stored as a friction characteristic of the tire.

The memory 14 may be constituted such that a tire friction characteristic is stored therein for each of various road surfaces such as a dry road surface, a wet road surface, and a frozen road surface and a friction characteristic corresponding to a state of a road surface judged by a vehicle is selected and called. A state of a road surface can be judged by a non-contact optical sensor or the like such as a CCD. Moreover, a state of a road surface can be judged comprehensively, taking into account various kinds of information such as an open air temperature or an operating state of a wiper. Further, a driver may judge a state of a road surface.

In addition, tire characteristics to be stored in the memory 14 are preferably supplied without constraint from an external device or a data recording medium. Even if tires are worn and tire friction characteristics change, changed characteristics can be supplied if necessary.

As a supply method, for example, the tire characteristics may be supplied to the memory 14 by wire or wireless communication.

In addition, many characteristics of tires that are likely to be mounted may be prepared and stored in advance in a ROM chip or the like for each product code or individual identification number. One characteristic may be selected out of plurality of the characteristics of tires stored in the ROM chip or the like by inputting a product code or an individual identification number, and the selected characteristic may be called by the signal generation unit 16. If the memory 14 is constituted by a replaceable ROM chip or the like, a ROM chip or the like having characteristics of tires recorded therein, which have been attached to the brake control device 10 simultaneously with replacement of the tire or the like, may be replaced when the tire is replaced.

The signal generation unit 16 uses the above-mentioned characteristic called from the memory 14 to find an optimum slip ratio at a vehicle velocity and, at the same time, find a current slip ratio, which is described later, at the time when a braking force is applied to wheels based on the vehicle velocity and a wheel velocity. Then, if a difference found by subtracting the optimum slip ratio from the current slip ratio is equal to or larger than a predetermined value, for example, equal to or larger than zero, the signal generation unit 16 generates a control signal for controlling the braking force applied to the wheels. Note that the above-mentioned predetermined value may be a negative value.

That is, the optimum slip ratio Sd is calculated from a vehicle velocity sent from the wheel velocity/vehicle velocity detection unit 12 using the above-mentioned coefficients "a" and "b".

On the other hand, a current slip ratio of each wheel is calculated. As described above, a slip ratio is a ratio found by calculating a difference by subtracting a wheel velocity from a vehicle velocity and dividing this difference by the vehicle velocity. The slip ratio calculated in this way is compared with the optimum slip ratio Sd. If the current slip ratio is larger than the optimum slip ratio, a difference between the current slip ratio and the optimum slip ratio is found, and a control signal for controlling a braking force to be applied to each wheel is generated according to this difference. The generated control signal is sent to the braking device 18.

Further, in the signal generation unit 16, a wheel velocity may be used instead of the vehicle velocity for finding the optimum slip ratio or an optimum slip velocity may be used instead of the optimum slip ratio.

The wheel velocity/vehicle velocity detection unit 12 and the signal generation unit 16 are portions whose functions are brought into action by an electronic control unit (ECU). That is, the wheel velocity/vehicle velocity detection unit 12 and the signal generation unit 16 are portions that give full performance to their functions by causing a microcomputer to execute a program. Such a program is recorded in a recording medium such as a ROM chip connected to the ECU, and called by the ECU to be started up.

The recording medium such as a ROM chip records a program as described below.

That is, the program includes:
a procedure for causing a microcomputer of an ECU to calculate a current slip velocity or a current slip ratio based on a vehicle velocity of a vehicle and wheel velocities of wheels;
a procedure for calling a friction characteristic of a tire with respect to a vehicle velocity or a wheel velocity stored in advance and using the called characteristic to cause the microcomputer of the ECU to calculate an optimum slip ratio or an optimum slip velocity at which a maximum friction force is generated for the tire at a vehicle velocity during travelling or a wheel velocity during travelling; and
a procedure for, if a difference found by subtracting the optimum slip ratio from the calculated current ratio or a difference found by subtracting the optimum slip velocity from the calculated current slip velocity is equal to or larger than a predetermined value, causing the microcomputer of the ECU to generate a control signal for controlling a braking force to be applied to a wheel mounted with the tire according to the difference.

The braking device 18 is a portion that has a hydraulic unit (HU) and a wheel cylinder connected to the hydraulic unit by hydraulic piping and supplies a hydraulic pressure adjusted based on the above-mentioned control signal to the wheel cylinder. For example, the wheel cylinder tightens a disk brake via a pad.

Note that a publicly known device structure is used for the hydraulic unit and the wheel cylinder, and structures of the hydraulic unit and the wheel cylinder are not specifically limited in the present invention.

The brake control device 10 is constituted as described above.

Next, a brake control method in accordance with this embodiment will be described.

Figure 3:
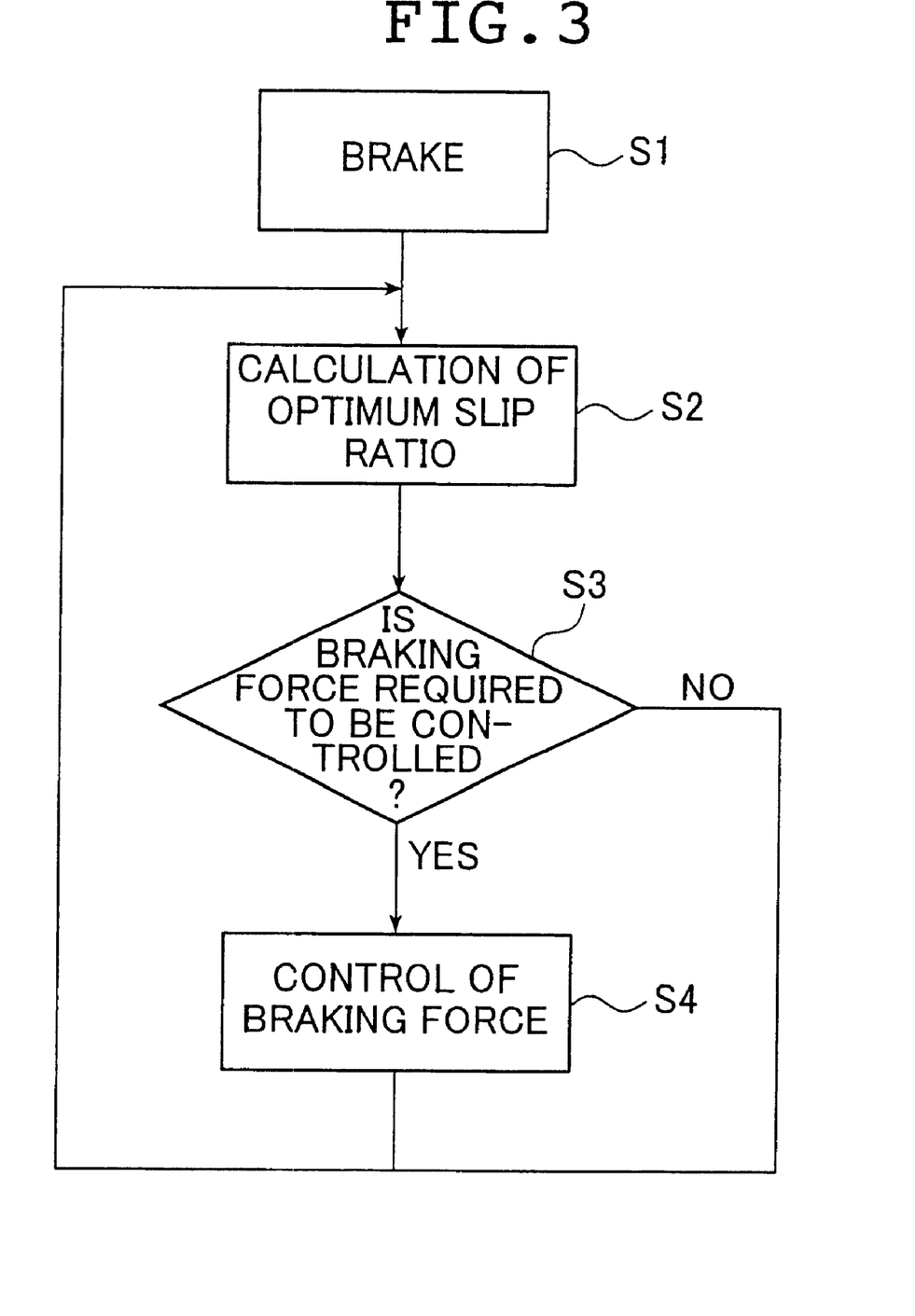
FIG. 3 is a flow chart showing an example of a brake control method of the present invention.

FIG. 3 is a flow chart showing the brake control method in accordance with the embodiment of the present invention. First, when a brake is put on with a predetermined pressure or more in order to stop a vehicle (step S1), a current slip ratio is calculated for each wheel based on a wheel velocity and a vehicle velocity detected by the wheel velocity/vehicle velocity detection unit 12, characteristic of an optimum slip ratio for the vehicle velocities, that is, coefficients "a" and "b" are called from the memory 14, and an optimum slip ratio is calculated (step S2). The calculated current slip ratio and the calculated optimum slip ratio are compared to judge whether or not a braking force is required to be controlled (step S3). Whether or not a rotation velocity is required to be adjusted is judged according to whether or not a difference found by subtracting the optimum slip ratio at a vehicle velocity at the time when the brake is put on from a current slip ratio at the time when the brake is put on is equal to or larger than a predetermined value. If the difference is smaller than the predetermined value, it is judged that a braking force applied to the wheel is not required to be adjusted.

On the other hand, if the difference is equal to or larger than the predetermined value, a braking force is controlled so as to reduce the wheel velocity to make the slip ratio coincide with the optimum slip ratio (step S4). Note that, for example, the predetermined value may be zero or a negative value.

If the predetermined value is negative and the difference is negative, the braking force applied to the wheel is increased. If the difference is positive, the braking force applied to the wheel is decreased.

In this way, the process of steps S2 to S4 is repeated to stop the vehicle. Note that, if a vehicle velocity has dropped to a predetermined value, for example, 10 km/h or less, it is preferable to make the slip ratio larger than at least the optimum slip ratio. In this case, the slip ratio may be one (slip ratio 100%), that is, the wheel may be locked.

The coefficients "a" and "b" of the above-mentioned expression (1) are stored in the memory 14 of this embodiment as a tire characteristic, and are called to calculate the optimum slip ratio Sd. However, other tire characteristic representing a relationship between the friction coefficient $\mu$ and a slip ratio or a slip velocity may be stored for various vehicle velocities, and the optimum slip ratio Sd may be found based on the characteristics. If data can be freely written in such a memory 14 as in a RAM or the like, a tire characteristic such as the coefficients "a" and "b" may be supplied via a data recording medium or a communication network, and from a transponder or the like that is provided in a tire and sends a tire characteristic recorded therein wirelessly in response to a call signal. In addition, a barcode having information of the above-mentioned tire characteristic recorded therein may be provided in a sidewall portion of a tire and read by a barcode reading device when the tire is replaced to read the above-mentioned characteristic and supply it to the memory 14 automatically.

Moreover, values of the coefficients "a" and "b" written on a label or the like, which is put on a tire tread portion or the like for a selling product of the tire, may be inputted from an input device such as a keyboard.

In this embodiment, in braking a vehicle, if a braking force is required to be controlled in order to adjust a wheel velocity, the braking force is controlled according to a difference between the current slip ratio and the optimum slip ratio to adjust the wheel velocity such that a slip ratio coincides with the optimum slip ratio. Therefore, the slip ratio can be controlled quantitatively. In addition, time required for measuring the optimum slip ratio can be eliminated, that is, a time lag before the brake control starts can be shortened. Thus, a braking distance can be reduced. Further, in this embodiment, since what is required for the braking control device are the detecting unit for detecting a vehicle velocity and a wheel velocity, the device can be simplified.

Next, another embodiment of the present invention will be described.

Figure 4:
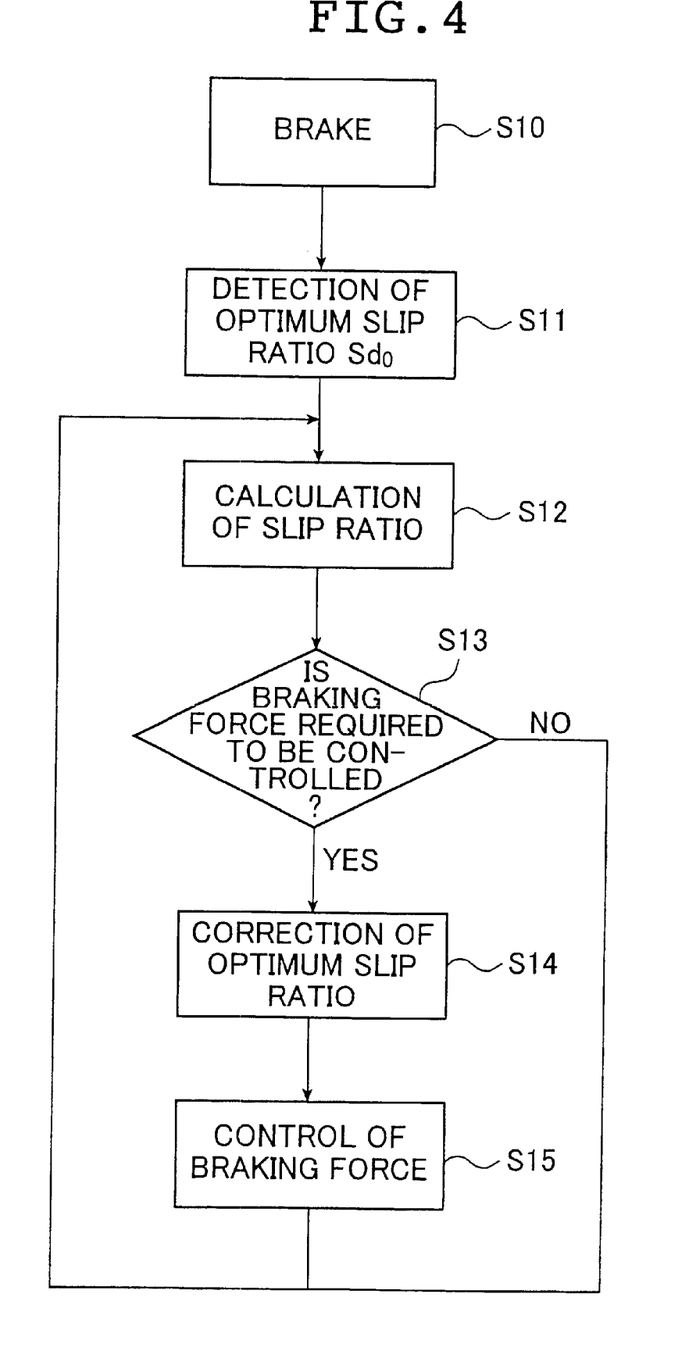
FIG. 4 is a flow chart showing another example of the brake control method of the present invention.

FIG. 4 is a flow chart showing a brake control method in accordance with another embodiment of the present invention. In this embodiment, components identical with those in the embodiments shown in FIGS. 1 to 3 are denoted by the identical reference numerals and detailed descriptions on the components are omitted. This embodiment is the same as the above-mentioned embodiment except that only the coefficient "a" is stored for each mounted tire in the memory 14 in advance instead of the coefficients "a" and "b".

The brake control method of this embodiment will be described. As shown in FIG. 4, first, when a brake is put on to a vehicle with a predetermined pressure or more (step S10), a vehicle velocity $V_0$ and an optimum slip ratio $Sd_0$ at this point are detected (step S11). In this case, a braking force is instantly applied to each wheel such that a slip ratio larger than an assumed optimum slip ratio $Sd_0$ is realized at the vehicle velocity $V_0$ to find a friction coefficient $\mu$ with a publicly known method. This process is repeated for a plurality of times and then, a value of a slip ratio at which a maximum value among the friction coefficients $\mu$ is obtained is detected as the optimum slip ratio $Sd_0$.

Next, a slip ratio at the vehicle velocity is calculated (step S12). Next, it is judged whether or not a braking force is required to controlled based on this calculated slip ratio (step S13). At the point when the optimum slip ratio $Sd_0$ is detected, since the slip ratio is larger than the optimum slip ratio $Sd_0$, it is judged that a braking force applied to each wheel is required to be controlled.

If it is judged that a braking force applied to each wheel is required to be controlled, the optimum slip ratio is corrected in accordance with a deviation of the current vehicle velocity from the vehicle velocity $V_0$ in step S11 (step S14). This deviation (deceleration is assumed to be positive) is multiplied by an absolute value of the above-mentioned coefficient "a" to obtain a correction amount. That is, when a current vehicle velocity is assumed to be $V_1$, the above-mentioned correction amount is represented as $|a|\times(V_0-V_1)$. This correction amount is added to the optimum slip ratio $Sd_0$. At the moment when the optimum slip ratio $Sd_0$ is detected, there is no correction amount because $V_0-V_1=0$.

Note that the coefficient "a" is in a range of −0.2 to −0.01 as described above. Preferably, the coefficient "a" is in a range of −0.15 to −0.03.

Next, a control signal for controlling a braking force is generated such that a slip ratio coincides with an optimum slip ratio in accordance with a difference between the optimum slip ratio found in step S14 and the slip ratio calculated in step S12, and a braking force applied to each wheel is controlled (step S15).

Moreover, returning to step S12, a slip ratio is calculated again, and it is checked whether the slip ratio coincides with the optimum slip ratio. In this case, if the slip ratio is within an allowable range in the neighborhood of the optimum slip ratio found in advance in step S14, a wheel velocity is not required to be adjusted. In other cases, the process of steps S13 to S15 is repeated to stop the vehicle.

In this embodiment, an optimum slip ratio of a tire is detected first and thereafter, a value of the optimum slip ratio detected first is corrected in accordance with decrease of a vehicle velocity. Then, a wheel velocity can be adjusted by applying a braking force to each wheel with the corrected optimum slip ratio as a control target. In this way, even if an optimum slip ratio is unknown, once the optimum slip ratio is detected, a correction amount of the optimum slip ratio can be found in an extremely short time using a velocity dependency of the optimum slip ratio thereafter. Therefore, a braking distance can be reduced compared with that in the conventional example.

The brake control device, the brake control method and the recording medium of the present invention have been described. However, it is needless to mention that the present invention is not limited to the above-mentioned embodiments and various improvements and modifications may be made without departing from the gist of the present invention.

As described above in detail, according to the present invention, characteristic of an optimum slip ratio stored in a memory device can be used to thereby find the optimum slip ratio very easily. Thus, when a brake is put on, a time lag before the brake control starts can be shortened and a braking distance of the vehicle can be reduced.

What is claimed is:

1. A brake control device of a vehicle which applies a braking force to a wheel mounted with a tire to brake the vehicle, comprising:
    a memory device storing therein a friction characteristic of the tire with respect to a vehicle velocity of the vehicle or a wheel velocity of the wheel;
    a detecting unit for detecting the vehicle velocity of the vehicle and the wheel velocity of the wheel;
    a signal generating unit for, when the braking force is applied to the wheel, finding a slip ratio based on the vehicle velocity and the wheel velocity detected by the detecting unit and, finding an optimum slip ratio, at which a maximum friction force is generated by the tire at the vehicle velocity or the wheel velocity detected by the detecting unit, by using the characteristic called from the memory device and, if a difference found by subtracting the optimum slip ratio from the found slip ratio is equal to or more than a predetermined value, generating a control signal for controlling the braking force according to the difference; and
    a braking unit for controlling the braking force based on the generated control signal to adjust the wheel velocity.

2. The brake control device according to claim 1, wherein the characteristic is supplied to the memory device from an external device or a data recording medium.

3. The brake control device according to claim 1, wherein the characteristic includes a rate of change of the optimum slip ratio with respect to the vehicle velocity or the wheel velocity, and the rate of change has a negative value.

4. The brake control device according to claim 1, wherein the memory device stores the characteristic that the optimum slip ratio changes linearly with respect to the vehicle velocity or the wheel velocity.

5. The brake control device according to claim 4,
wherein, when the vehicle velocity or the wheel velocity is assumed to be a velocity V (km/h), and the optimum slip ratio with respect to the velocity V is assumed to be Sd (%), the memory device stores coefficients "a" and "b" represented by a following expression (1) for the characteristic:

$$Sd = a \times V + b \tag{1}$$

6. The brake control device according to claim 5,
wherein the coefficient "a" is a value in a range of −0.2 to −0.01.

7. A brake control device of a vehicle which applies a braking force to a wheel mounted with a tire to brake the vehicle, comprising:
 a memory device storing therein a friction characteristic of the tire with respect to a vehicle velocity of the vehicle or a wheel velocity of the wheel;
 a detecting unit for detecting the vehicle velocity of the vehicle and the wheel velocity of the wheel;
 a signal generating unit for, when the braking force is applied to the wheel, finding a slip velocity based on the vehicle velocity and the wheel velocity detected by the detecting unit and, finding an optimum slip velocity, at which a maximum friction force is generated by the tire at the vehicle velocity or the wheel velocity detected by the detecting unit, by using the characteristic called from the memory device and, if a difference found by subtracting the optimum slip velocity from the found slip velocity is equal to or more than a predetermined value, generating a control signal for controlling the braking force according to the difference; and
 a braking unit for controlling the braking force based on the generated control signal to adjust the wheel velocity.

8. The brake control device according to claim 7,
wherein the characteristic is supplied to the memory device from an external device or a data recording medium.

9. The brake control device according to claim 7,
wherein the characteristic includes a rate of change of the optimum slip velocity with respect to the vehicle velocity or the wheel velocity, and the rate of change has a negative value.

10. The brake control device according to claim 7,
wherein the memory device stores the characteristic that the optimum slip velocity changes quadratically with respect to the vehicle velocity or the wheel velocity.

11. The brake control device according to claim 10,
wherein, when the vehicle velocity or the wheel velocity is assumed to be a velocity V (km/h), and the optimum slip velocity is assumed to be Sv (km/h), the memory device stores coefficients "a" and "b" represented by a following expression (2) for the characteristic:

$$Sv = (a \times V + b) \times V / 100 \tag{2}$$

12. The brake control device according to claim 11,
wherein the coefficient "a" is a value in a range of −0.2 to −0.01.

13. A brake control method for a vehicle which applies a braking force to a wheel mounted with a tire to brake the vehicle, comprising:
 detecting a vehicle velocity of the vehicle and a wheel velocity of the wheel;
 finding a slip ratio based on the detected vehicle velocity and wheel velocity;
 when the braking force is applied to the wheel, finding an optimum slip ratio at which a maximum friction force is generated by the tire at the detected vehicle velocity or wheel velocity, by using a friction characteristic of the tire with respect to the vehicle velocity or the wheel velocity;
 if a difference found by subtracting the optimum slip ratio from the found slip ratio is equal to or more than a predetermined value, generating a control signal for controlling the braking force according to the difference; and
 controlling the braking force based on the generated control signal to adjust the wheel velocity.

14. A brake control method for a vehicle which applies a braking force to a wheel mounted with a tire to brake the vehicle, comprising:
 detecting a vehicle velocity of the vehicle and a wheel velocity of the wheel;
 finding a slip velocity based on the detected vehicle velocity and wheel velocity;
 when the braking force is applied to the wheel, finding an optimum slip velocity, at which a maximum friction force is generated by the tire at the detected vehicle velocity or wheel velocity, by using a friction characteristic of the tire with respect to the vehicle velocity or the wheel velocity;
 if a difference found by subtracting the optimum slip velocity from the found slip velocity is equal to or more than a predetermined value, generating a control signal for controlling the braking force according to the difference; and
 controlling the braking force based on the generated control signal to adjust the wheel velocity.

15. A recording medium having recorded therein a computer readable program for causing a computer to perform adjustment of a braking force, when the braking force is applied to a wheel mounted with a tire to brake a vehicle,
 wherein the program includes:
  a procedure for causing a computing unit of the computer to calculate a slip ratio based on a vehicle velocity of the vehicle and a wheel velocity of the wheel;
  a procedure for calling a friction characteristic of the tire with respect to the vehicle velocity or the wheel velocity stored in a memory device of the computer in advance and causing the computing unit to calculate an optimum slip ratio, at which a maximum friction force is generated by the tire at the vehicle velocity or the wheel velocity, by using the called characteristic;
  a procedure for, if a difference found by subtracting the optimum slip ratio from the calculated slip ratio is equal to or larger than a predetermined value, causing the computing unit to generate a control signal for controlling the braking force according to the difference.

16. A recording medium having recorded therein a computer readable program for causing a computer to perform adjustment of a braking force, when the braking force is applied to a wheel mounted with a tire to brake a vehicle,
 wherein the program includes:

a procedure for causing a computing unit of the computer to calculate a slip velocity based on a vehicle velocity of the vehicle and a wheel velocity of the wheel;

a procedure for calling a friction characteristic of the tires with respect to the vehicle velocity or the wheel velocity stored in a memory device of the computer in advance and causing the computing unit to calculate an optimum slip velocity, at which a maximum friction force is generated by the tire at the vehicle velocity or the wheel velocity, by using the called characteristic;

a procedure for, if a difference found by subtracting the optimum slip velocity from the calculated slip velocity is equal to or larger than a predetermined value, causing the computing unit to generate a control signal for controlling the braking force according to the difference.

* * * * *